(12) United States Patent
Yang et al.

(10) Patent No.: US 9,630,242 B2
(45) Date of Patent: Apr. 25, 2017

(54) DEVICE AND METHOD FOR CONTINUOUSLY MEASURING FLOW RATE NEAR LIQUID STEEL SURFACE

(71) Applicant: BAOSHAN IRON & STEEL CO., LTD., Shanghai (CN)

(72) Inventors: Jian Yang, Shanghai (CN); Jianjun Zhi, Shanghai (CN); Kai Zhu, Shanghai (CN); Jianhua Zhu, Shanghai (CN); Zhengjie Fan, Shanghai (CN); Ruizhi Wang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 37 days.

(21) Appl. No.: 14/646,040

(22) PCT Filed: Mar. 20, 2013

(86) PCT No.: PCT/CN2013/072950
§ 371 (c)(1),
(2) Date: May 20, 2015

(87) PCT Pub. No.: WO2014/079181
PCT Pub. Date: May 30, 2014

(65) Prior Publication Data
US 2015/0316574 A1 Nov. 5, 2015

(30) Foreign Application Priority Data
Nov. 26, 2012 (CN) .......................... 2012 1 0487402

(51) Int. Cl.
*G01F 1/28* (2006.01)
*B22D 2/00* (2006.01)
(Continued)

(52) U.S. Cl.
CPC ................ *B22D 2/00* (2013.01); *B22D 11/16* (2013.01); *G01F 1/28* (2013.01); *G01P 5/04* (2013.01); *G01P 5/06* (2013.01)

(58) Field of Classification Search
None
See application file for complete search history.

(56) References Cited

U.S. PATENT DOCUMENTS 3,602,037 A * 8/1971 Neu .......................... G01F 1/28
116/DIG. 5
2015/0300849 A1* 10/2015 Yang ........................ B22D 2/00
73/861.75

FOREIGN PATENT DOCUMENTS

| CN | 201283416 Y | 8/2009 |
| CN | 102019377 A | 4/2011 |

(Continued)

OTHER PUBLICATIONS

European Patent Office, Extended European Search Report, Application No. 13856075.0, Aug. 26, 2016.
(Continued)

*Primary Examiner* — Harshad R Patel
(74) *Attorney, Agent, or Firm* — Brady & Quarles LLP

(57) ABSTRACT

A device for continuously measuring the flow rate of steel melt near surface thereof, comprising a flow rate detecting rod (18) and a deflection means (B) for the flow rate detecting rod, wherein the flow rate detecting rod (18) comprises a refractory material tube at one end and a stainless steel rod at the other end, and the stainless steel rod is fittedly connected with the refractory material tube. Also provided is a method for continuously measuring the flow rate of steel melt near surface thereof.

8 Claims, 15 Drawing Sheets

(51) Int. Cl.
*G01P 5/06* (2006.01)
*B22D 11/16* (2006.01)
*G01P 5/04* (2006.01)

(56) References Cited

FOREIGN PATENT DOCUMENTS

| | | |
|---|---|---|
| CN | 202305554 U | 7/2012 |
| JP | H04178525 A | 6/1992 |
| JP | H0560774 A | 3/1993 |
| JP | H0815293 A | 1/1996 |
| JP | 3449169 B2 | 9/2003 |

OTHER PUBLICATIONS

The State Intellectual Property Office of People's Republic of China, First Office Action, Application No. 201210487402.X, Aug. 6, 2015.

* cited by examiner

DEVICE AND METHOD FOR CONTINUOUSLY MEASURING FLOW RATE NEAR LIQUID STEEL SURFACE

CROSS-REFERENCE TO RELATED APPLICATIONS

This application represents the national stage entry of PCT International Application No. PCT/CN2013/072950 filed Mar. 20, 2013, which claims priority of Chinese Patent Application No. 201210487402.X filed Nov. 26, 2012, the disclosures of which are incorporated by reference here in their entirety for all purposes.

TECHNICAL FIELD

The invention relates to a device and a method for measuring a flow parameter of high-temperature steel melt, more particularly to a device and a method for measuring the flow rate of steel melt near the surface thereof.

BACKGROUND ART

Direct measurement of the flow rate of steel melt near the surface thereof in a crystallizer allows control over the flow field of the steel melt in the crystallizer, so as to reduce effectively the surface flaws of a continuous casting blank caused by entrapped mold flux, inclusions, bubbles and the like, which, in turn, reduces the occurrence of the surface flaws of a cold rolled plate such as an automobile shell plate, silicon steel, etc. Apparently, the key of the control over the flow rate near the surface in a crystallizer is measurement of the flow rate of the steel melt near the surface in the crystallizer.

The flow field of the steel melt in a crystallizer or tundish is of great significance to the control over inclusions and the surface quality of a casting blank in the process of steel making. Due to the high temperature up to about 1600° C. of steel melt, the devices and methods commonly used for measuring liquid flow rates do not work. Hence, measurement of the flow rate of high-temperature steel melt becomes a difficult technical problem in the field of steel making.

In a continuous casting process, the mold flux in a crystallizer functions to prevent oxidation of the steel melt surface, act as a lubricant between the crystallizer and a casting blank, capture floating inclusions, and keep the temperature of the steel melt. However, in order to improve the surface quality of a continuous casting blank, inclusion of the mold flux in the crystallizer into the steel melt must be inhibited.

As shown in FIGS. 1 and 2, in a continuous casting process of steel making, the steel melt in a tundish 10 is infused into a crystallizer 5 through a tundish dam 9, a slide nozzle 11 and a submerged nozzle 1 in sequence. The steel melt flows out from the outlet 3 of the submerged nozzle, impinges on the short-side wall of the crystallizer, and forms an upward countercurrent 4 moving toward the steel melt surface in the crystallizer and a downward countercurrent 6 moving toward the bottom of the crystallizer.

When the upward countercurrent 4 exhibits an unduly large flow rate, the fluctuation of the steel melt surface in the crystallizer tends to be increased, resulting in engulfment of the mold flux into the steel melt. If the engulfment and mixing of the mold flux occurs, surface flaws of the cold rolled steel plate will be incurred, and thus the product yield will be decreased. However, when the upward countercurrent 4 exhibits an unduly small flow rate, the flowability of the steel melt adjacent to the meniscus will be decreased. As a result, the temperature of the steel melt at the meniscus will decrease, and thus the mold flux will not be melted sufficiently, such that the function of the mold flux for capturing floating inclusions will be degraded. Instead, the inclusions and mold flux are captured at the solidified shell 7 near the meniscus, which also leads to increased occurrence of flaws in the final product of cold rolled strip.

Therefore, development of a suitable flow field pattern and a suitable flow rate distribution in the crystallizer is critically important for the control of inclusions in a continuous casting blank and the surface quality of the continuous casting blank, as well as the surface quality of a cold rolled product such as an automobile shell plate, etc.

It is proposed in a patent literature (Japanese Patent Publication H 4-178525) that a ceramic rod is inserted into steel melt and applies a pressure to a pressure sensor arranged above the ceramic rod along the flow direction due to the impact of the flowing movement of the steel melt. The pressure sensed by the pressure sensor may be converted into the flow rate near the surface of the steel melt. Unfortunately, the device used in this measurement method is rather complicated. Moreover, the harsh high-temperature environment also influences the precision and stability of the pressure sensor in operation, leading to large error in flow rate measurement. In addition, the pivot of the pressure sensing rod for flow rate measurement is located adjacent to the upper top of the sensing rod. As such, a large moment is needed to rotate the sensing rod to a particular angle. Hence, the sensitivity of the flow rate measurement is not good. The influence is even more remarkable when the flow rate of the steel melt in a crystallizer and the like is low.

SUMMARY

The object of the invention is to provide a device and a method for continuously measuring the flow rate of steel melt near the surface thereof so as to address the deficiency of large error caused by complexity of the structure of the measurement device and large influence of the high-temperature environment in the prior art.

According to the invention, there is provided a device for continuously measuring the flow rate of steel melt near the surface thereof. The device comprises a flow rate detecting rod and a deflection means for the flow rate detecting rod, wherein one end of the flow rate detecting rod is a refractory material tube, while the other end is a stainless steel rod which is fittedly connected with the refractory material tube. The flow rate detecting rod comprises a refractory material of a single compound selected from $Al_2O_3$, $MgO$, $SiO_2$, $CaO$, $ZrO_2$, $SiC$ or of a composite of two or more of the above compounds. The flow rate detecting rod has a length of 10-100 cm and a diameter of 5-50 mm. The deflection means for the flow rate detecting rod comprises a fastening screw for the flow rate detecting rod, and the flow rate detecting rod is fixed to the deflection means for the flow rate detecting rod by the fastening screw for the flow rate detecting rod.

According to an embodiment of the invention, the deflection means for the flow rate detecting rod comprises a flow rate detecting rod counterweight, a deflection bearing sleeve, a deflection bearing, a deflection angle indicating board, a deflection angle pointer and a fastening screw for the flow rate detecting rod. Both the deflection bearing sleeve and the deflection bearing are circular parts, and the deflection bearing is slidably set against the inner wall of the deflection bearing sleeve. The outer surface of the deflection bearing sleeve comprises a counterweight rod extending outward. The counterweight rod and the fastening screw for the flow rate detecting rod are fixed to the outer surface of the deflection bearing sleeve, and they are spaced by 180 degrees. The flow rate detecting rod counterweight is fixed to the counterweight rod. The deflection angle indicating board has a shape of sector, wherein the vertex of the sector is fixed to an end face of the deflection bearing, and the surface of the arc of the sector comprises scales. The deflection angle pointer is fixed to the vertex of the sector at one end, and the other end points to the scales on the arc of the sector. The deflection angle pointer is parallel to the flow rate detecting rod, and rotates as the flow rate detecting rod rotates. The flow rate detecting rod is fixed to the outer surface of the deflection bearing sleeve using the fastening screw for the flow rate detecting rod.

According to an embodiment of the invention, the flow rate detecting rod counterweight comprises an upper fastening screw, a balancing disc and a lower fastening screw. The balancing disc is a circular counterweight disc set around the counterweight rod. The upper and lower fastening screws are fixed to the counterweight rod from the upper and lower sides respectively, limiting the position of the balancing disc.

According to an embodiment of the invention, the device further comprises supports of the flow rate measuring device, a support base and leveling screws. Four supports of the flow rate measuring device are fixed vertically to the upper surface of the support base, and four underlying feet extend from the lower surface of the support base in four directions respectively, wherein a leveling screw is arranged vertically on each underlying foot, and is adjustable in the vertical direction.

According to an embodiment of the invention, the device further comprises an up-down movement means for the flow rate detecting rod. The up-down movement means for the flow rate detecting rod comprises a moving rail, moving pulleys, a moving support plate, fastening screws for the moving support plate, a position fixing means and a connecting rod for fixing position. The moving rail is arranged on the support of the flow rate measuring device. Four moving pulleys are arranged on the moving support plate, and fixed to the lower surface of the support plate using the fastening screws for the moving support plate which penetrate through the upper and lower surfaces of the support plate. The moving pulleys are inset in the moving rail. The position fixing means is arranged on a support of the flow rate measuring device, and the moving support plate and the position fixing means are connected via the connecting rod for fixing position.

According to an embodiment of the invention, the device further comprises a horizontal support rod and a support rod fastening screw. The horizontal support rod is arranged horizontally, one end of which is connected to the up-down movement means for the flow rate detecting rod, and the other end of which is inserted into the circular ring of the deflection bearing. The support rod fastening screw is arranged at the top of the horizontal support rod, tightly close to an end face of the deflection bearing.

In another aspect, the invention also provides a method for measuring the flow rate of steel melt near the surface thereof, comprising the following steps: step 1, determining the barycenter of the flow rate detecting rod, the rotational pivot of the flow rate detecting rod and the acting point of the impact force on the flow rate detecting rod; step 2, calculating the distance between the rotational pivot and the barycenter, as well as the distance between the rotational pivot and the acting point of the impact force; step 3, measuring the gravity value of the flow rate detecting rod; step 4, baking the flow rate detecting rod at a high temperature in the range of 1000-1500° C. for about 10 min; step 5, inserting the baked flow rate detecting rod into the steel melt to obtain a rotational angle and an insertion depth; step 6, collecting continuous and average values of the rotational angle in a period of time; step 7, calculating the impact force of the steel melt; step 8, measuring continuous and average values of the projection area of the flow rate detecting rod in a direction perpendicular to the flowing direction of the steel melt, the density of the steel melt and the drag force coefficient; step 9, calculating the peak value, the average value and the continuous values of the flow rate of the steel melt based on the continuous and average values of the rotational angle, the projection area, the density of the steel melt and the drag force coefficient; step 10, estimating the flow rate of the steel melt based on the peak value, the average value and the continuous values of the flow rate of the steel melt.

According to an embodiment of the invention, the flow rate detecting rod is inserted into the flowing steel melt and subject to the action of gravity and the impact force of the flowing steel melt; when the flow rate detecting rod deflects to a certain angle and achieves a balance state, the moment generated by the gravity and the moment generated by the impact force of the flowing steel melt arrives at equilibrium.

According to an embodiment of the invention, step 1 further comprises setting a flow rate detecting rod counterweight so as to adjust the barycenter of the flow rate detecting rod to a position close to the rotational pivot of the flow rate detecting rod, such that the flow rate detecting rod and the counterweight are substantially in a state of gravity balance. As such, the sensitivity to the rotational of the flow rate detecting rod may be maximized. Particularly under conditions of a low flow rate of the steel melt, the flow rate of the steel melt near the surface thereof can be measured more accurately.

The measurement method of the invention is simple and intuitional, and the measurement results are reliable. Each time the flow rate of steel melt near the surface thereof is measured, only one replacement of the flow rate detecting rod is required. As the flow rate detecting rod is cheap, the flow rate measurement is cost effective. Therefore, the device and the method for measuring the flow rate of steel melt near the surface thereof according to the invention has such advantages as high measurement precision, intuitional and reliable measurement results, simple measurement operation, low measurement cost, etc.

DESCRIPTION OF DRAWING

In the invention, the same reference number always represents the same feature, wherein.

DETAILED DESCRIPTION OF THE INVENTION

The technical solution of the invention will be further illustrated with reference to the accompanying drawings and examples.

The invention provides a device and a method for continuously measuring the flow rate of steel melt near the surface thereof. The device and method may be used conveniently in the practical steel manufacture to continuously measure the flow rate of steel melt near the surface thereof, and has such advantages as high measurement precision, intuitional and reliable measurement results, simple measurement operation, low measurement cost, continuous measurement of flow rate within 100 s, etc. It is particularly suitable for measuring and controlling the flow rate of steel melt near the surface thereof in a crystallizer. Limitation of the flow rate of steel melt near the surface thereof in a crystallizer to a rational range allows for effective control over the inclusions in a continuous casting blank and improvement of the surface quality of the casting blank, and in turn, reduces the occurrence of the flaws in a cold rolled thin plate such as an automobile shell plate, etc.

The flow field of the steel melt in a crystallizer or tundish is of great significance to the control over inclusions in a casting blank and the surface quality of the casting blank in steel making. Since the steel melt has a high temperature up to about 1600° C., the devices commonly used for measuring liquid flow rates do not work. Hence, measurement of the real flow rate of steel melt becomes a difficult technical problem in the field of steel making. Based on careful analysis of the devices and methods used in the prior art for measuring the flow rate of high-temperature steel melt, there is provided in the invention a new device and a new method for measuring the flow rate of steel melt near the surface thereof to overcome the above deficiencies.

First of all, the principle and steps of the method for measuring the flow rate of steel melt near the surface thereof according to the invention will be illustrated.

A flow rate detecting rod is inserted into flowing steel melt, and is deflected due to the impact of the flowing movement of the steel melt. The relationship between the insertion depth of the flow rate detecting rod, the deflection angle and the flow rate of the steel melt has been deduced in advance. When the insertion depth and the deflection angle are measured, the flow rate of the steel melt near the surface may be obtained by conversion using the above relationship.

Figure 9:
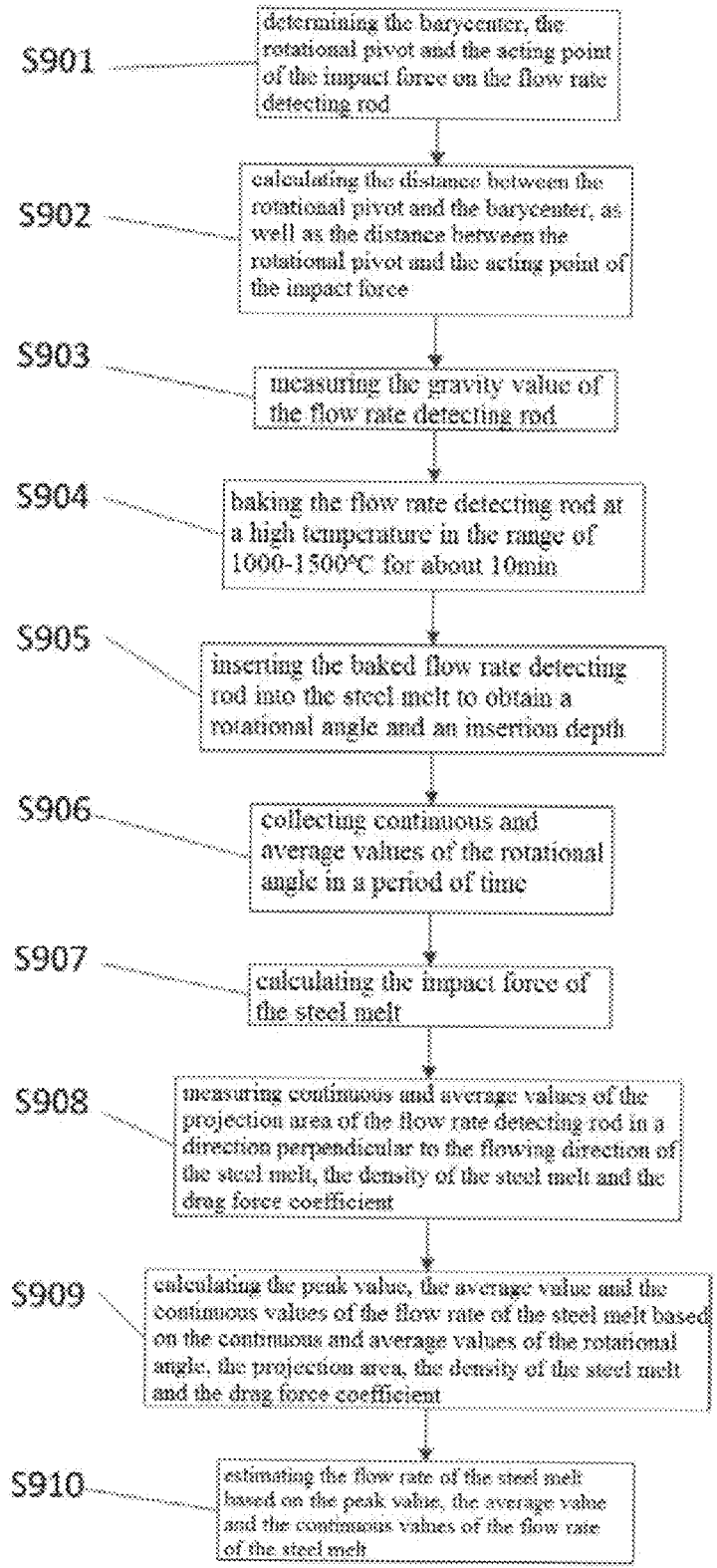
FIG. 9 is a flow chart showing the method for continuously measuring the flow rate of steel melt near the surface thereof according to the invention.

In view of the above principle, the method for measuring the flow rate of steel melt near the surface thereof according to the invention comprises the steps shown in FIG. 9:

S901: determining the barycenter of the flow rate detecting rod, the rotational pivot of the flow rate detecting rod and the acting point of the impact force on the flow rate detecting rod;

S902: calculating the distance between the rotational pivot and the barycenter, as well as the distance between the rotational pivot and the acting point of the impact force;

S903: measuring the gravity value of the flow rate detecting rod;

S904: baking the flow rate detecting rod at a high temperature in the range of 1000-1500° C. for about 10 min;

S905: inserting the baked flow rate detecting rod into the steel melt to obtain a rotational angle and an insertion depth;

S906: collecting continuous and average values of the rotational angle in a period of time;

S907: calculating the impact force of the steel melt;

S908: measuring continuous and average values of the projection area of the flow rate detecting rod in a direction perpendicular to the flowing direction of the steel melt, the density of the steel melt and the drag force coefficient;

S909: calculating the peak value, the average value and the continuous values of the flow rate of the steel melt based on the continuous and average values of the rotational angle, the projection area, the density of the steel melt and the drag force coefficient;

S910: estimating the flow rate of the steel melt based on the peak value, the average value and the continuous values of the flow rate of the steel melt.

Figure 1:
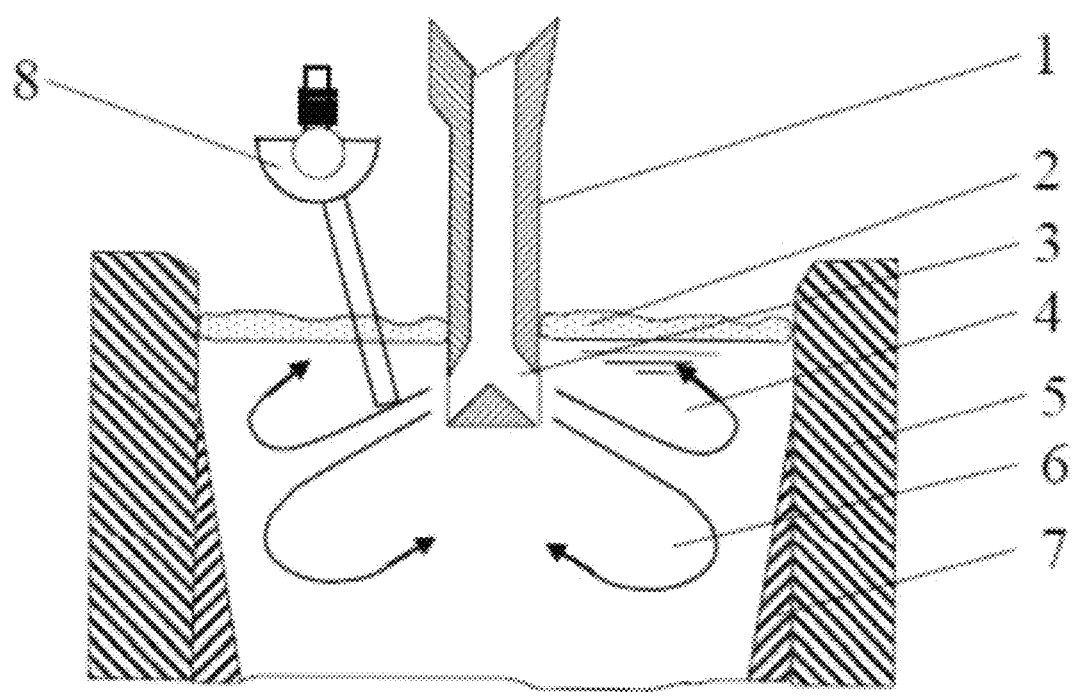
FIG. 1 is a schematic front view of a flow field device in a crystallizer.
Figure 2:
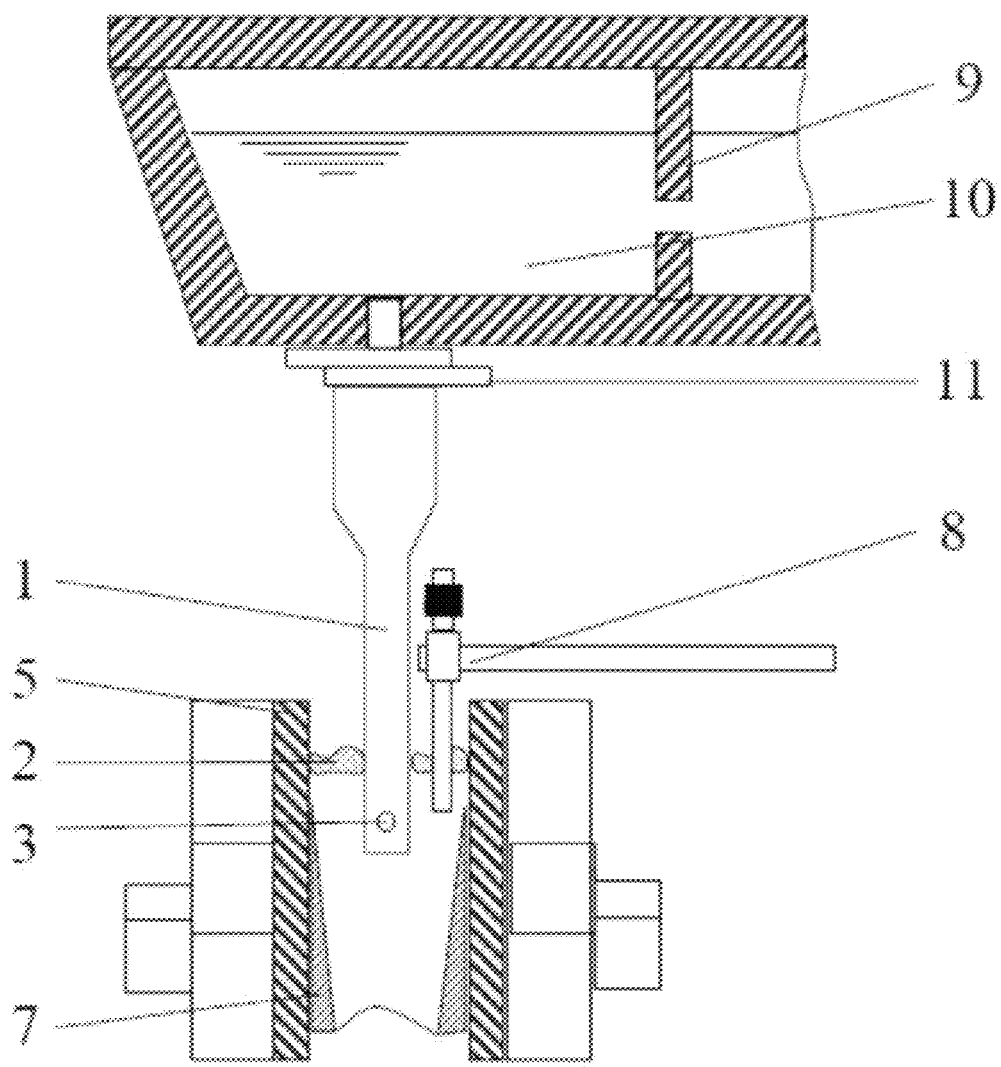
FIG. 2 is a schematic side view of a flow field device in a crystallizer.
Figure 3:
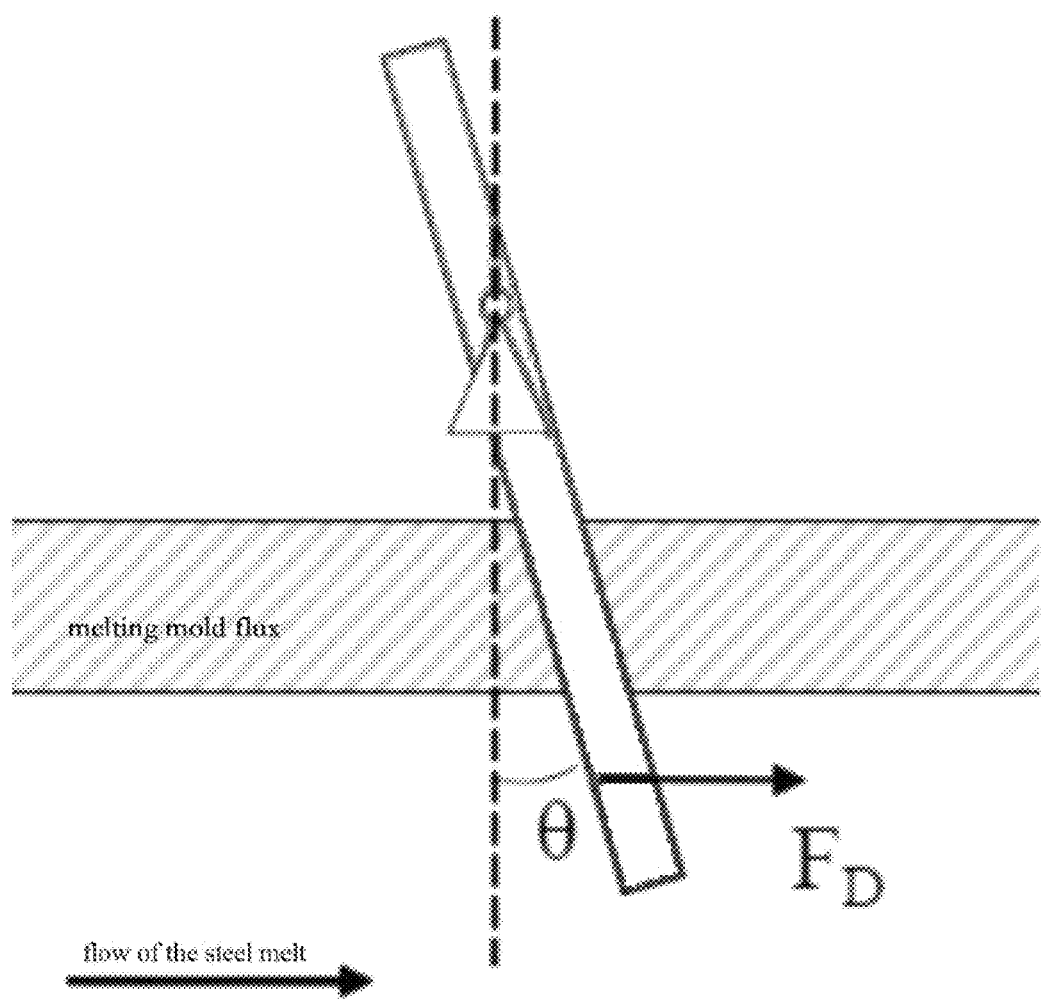
FIG. 3 is a schematic view showing the deflection of a flow rate detecting rod of the invention in flowing steel melt.
Figure 4:
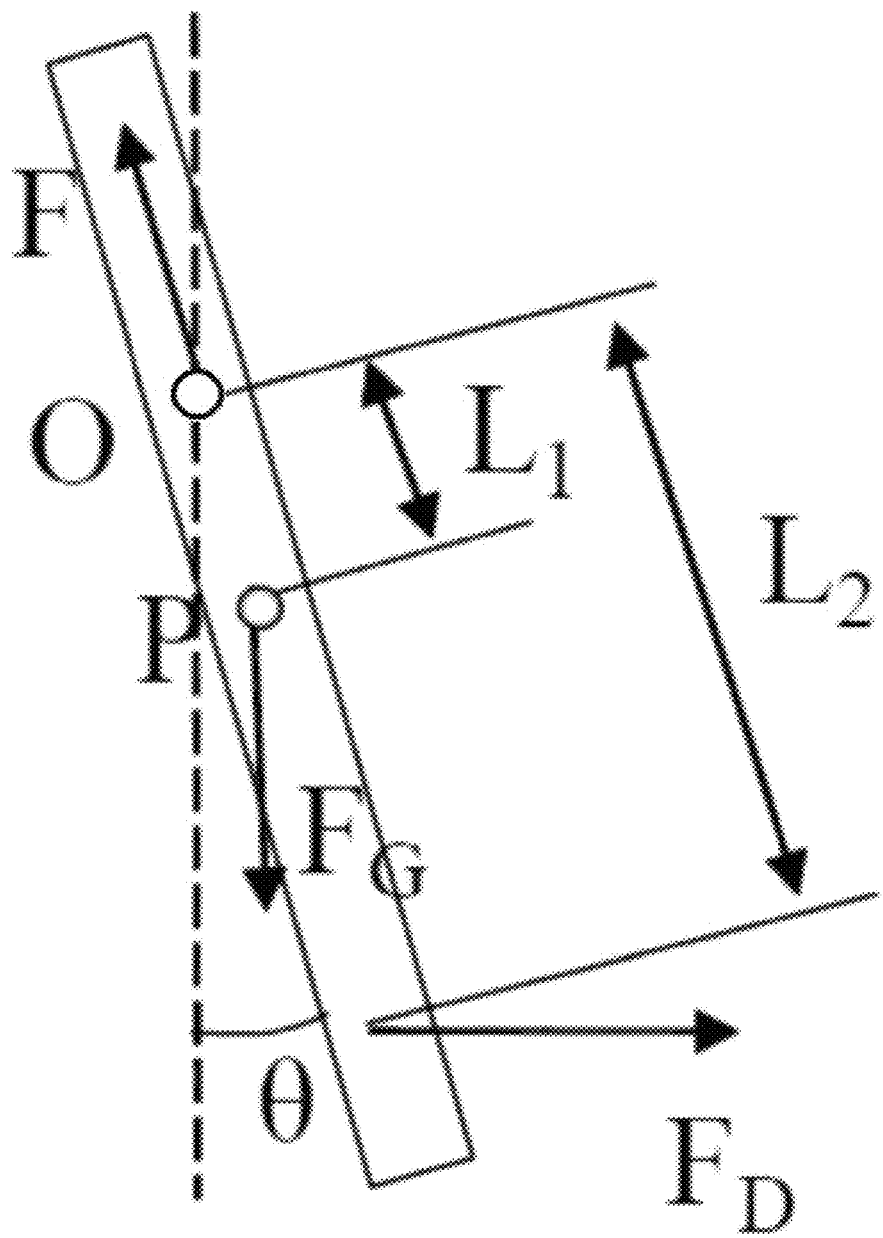
FIG. 4 is a diagram showing the analysis of the forces acted on a flow rate detecting rod in flowing steel melt.

FIG. 3 is a schematic view showing the deflection (to a deflection angle θ) of a flow rate detecting rod inserted in flowing steel melt due to the impact force $F_D$ of the flowing steel melt. FIG. 4 is a diagram showing the analysis of the forces acted on a flow rate detecting rod in flowing steel melt. When inserted into flowing steel melt, the flow rate detecting rod is subject to the action of gravity $F_G$ and the impact force of the flowing steel melt $F_D$. When the flow rate detecting rod deflects to a certain angle θ and achieves a balance state, the moment generated by the gravity and that generated by the impact force of the flowing steel melt arrives at equilibrium as shown by formula (1).

$$F_G \cdot L_1 \cdot \sin\theta = F_D \cdot L_2 \cos\theta \tag{1}$$

wherein $F_G$ is gravity (N), $L_1$ is the distance between the barycenter G of the flow rate detecting rod and the rotational pivot of the flow rate detecting rod (m), $F_D$ is the impact force of the flowing steel melt (N), $L_2$ is the distance between the acting point of the impact force and the rotational pivot of the flow rate detecting rod (m), and θ is the rotational angle of the flow rate detecting rod. Since the impact force of the flowing steel melt is equivalent to the drag force on the flow rate detecting rod, the impact force may be calculated according the following formula (2).

$$F_D = C_D \frac{\rho U_0^2}{2} A \tag{2}$$

wherein $U_0$ is the flow rate of the steel melt (m/s), A is the projection area of the flow rate detecting rod in a direction perpendicular to the flowing direction of the steel melt (m²), ρ is the density of the steel melt (kg/m³), and $C_D$ is the drag force coefficient which may be obtained according to the relationship between the drag force coefficient and the Renault number. Formulae (1) and (2) may be combined to give the following formula (3), which is used for calculating the flow rate of the steel melt:

$$U_0 = \sqrt{\frac{2L_1 F_G \tan\theta}{\rho A L_2 C_D}} \quad (3)$$

As shown by formula (3) for calculating the flow rate of steel melt, $F_G$ and $L_1$ are intrinsic parameters of a flow rate detecting rod; the value of $L_2$ may be obtained by measuring the insertion depth of the flow rate detecting rod in the steel melt; when the deflection angle $\theta$ of the flow rate detecting rod in the steel melt is measured, the projection area A of the flow rate detecting rod in a direction perpendicular to the flowing direction of the steel melt may be obtained; and the drag force coefficient $C_D$ may be obtained according to the flow rate range, then the flow rate of the steel melt near the surface thereof can be determined.

Additionally, in the design of the flow rate measurement device, by adjusting the barycenter G of the flow rate detecting rod to a position very close to the rotational pivot of the flow rate detecting rod, such that the flow rate detecting rod and the counterweight are substantially in a state of gravity balance, the rotational sensitivity of the flow rate detecting rod may be increased significantly, so that the sensitivity of the flow rate detecting rod to the flowing movement of the steel melt and the measurement precision of the flow rate of the steel melt can be improved. As the flow rate of the steel melt in a crystallizer is generally smaller than 1 m/s, which falls in a range of low flow rate, this measuring device may increase effectively the measurement accuracy of the flow rate of the steel melt near the surface in the crystallizer.

As known from the above description, the measuring method of the invention is simple in principle, and the measurement results are intuitional and reliable. The flow rate of the steel melt near the surface as measured is actually an average flow rate of the steel melt in the surface layer whose depth equals to the insertion depth of the flow rate detecting rod.

In the technical solution of the invention, when the flow rate of steel melt near the surface in a crystallizer is measured, the flow rate detecting rod is desirably not made of a magnetic metal material to avoid interference of electromagnetic field on the measurement results of the flow rate. That is because the flow field in the crystallizer is generally adjusted by electromagnetic means such as electromagnetic stirring, electromagnetic braking, etc. in the process of continuous casting.

The flow rate detecting rod comprises a refractory material of a single compound selected from $Al_2O_3$, $MgO$, $SiO_2$, $CaO$, $ZrO_2$, $SiC$ or of a composite of two or more of the above compounds. These refractory material tubes are fittedly connected with the stainless steel rod. When a flow rate detecting rod made of a refractory material is used to measure the flow rate of steel melt near the surface, the refractory rod will be fused and broken in the molten steel at high temperature due to the erosion effect of the mold flux, and there is about 100 seconds before the flow rate detecting rod of the refractory material fuses and breaks. As such, the flow rate of the steel melt at its surface in a crystallizer may be measured continuously for 100 s to obtain continuous variation values of the flow rate at the surface of the steel melt and the trend of the variation can be acquired. The flow rate detecting rod shall be withdrawn quickly within 100 s to avoid fusion of the refractory rod by the mold flux and protection the refractory rod from falling into the steel melt.

When used to detect the flow rate of steel melt near the surface in a crystallizer, the flow rate detecting rod has a length of 10 cm to 100 cm. If the length of the flow rate detecting rod is less than 10 cm, the flow rate detecting rod can not be inserted into the steel melt effectively. If the length of the flow rate detecting rod is more than 100 cm, the flow rate detecting rod will be too long to be conveniently inserted into the steel melt in the crystallizer to detect the flow rate due to the small distance between the tundish and the crystallizer.

The suitable diameter of the flow rate detecting rod is 5 mm to 50 mm. If the diameter of the flow rate detecting rod is smaller than 5 mm, the flow rate detecting rod will be fused quickly in the steel melt, and effective measurement of the flow rate can not be achieved. If the diameter of the flow rate detecting rod is larger than 50 mm, firstly the flow field in the crystallizer will be disturbed by the large diameter of the flow rate detecting rod, and secondly the flow rate detecting spot will become too large to achieve the accurate detection of the flow rate at a particular position. Consequently, the deflection sensitivity of the flow rate detecting rod will be degraded, and in turn, the accuracy of the flow rate measurement will be decreased. Moreover, the cost of the flow rate detecting rod will increase accordingly.

In the real measurement the flow rate of high-temperature steel melt near the surface, the flow rate detecting rod will be replaced after each measurement of the flow rate. As such, the accuracy of the flow rate measurement can be guaranteed.

Figure 5:
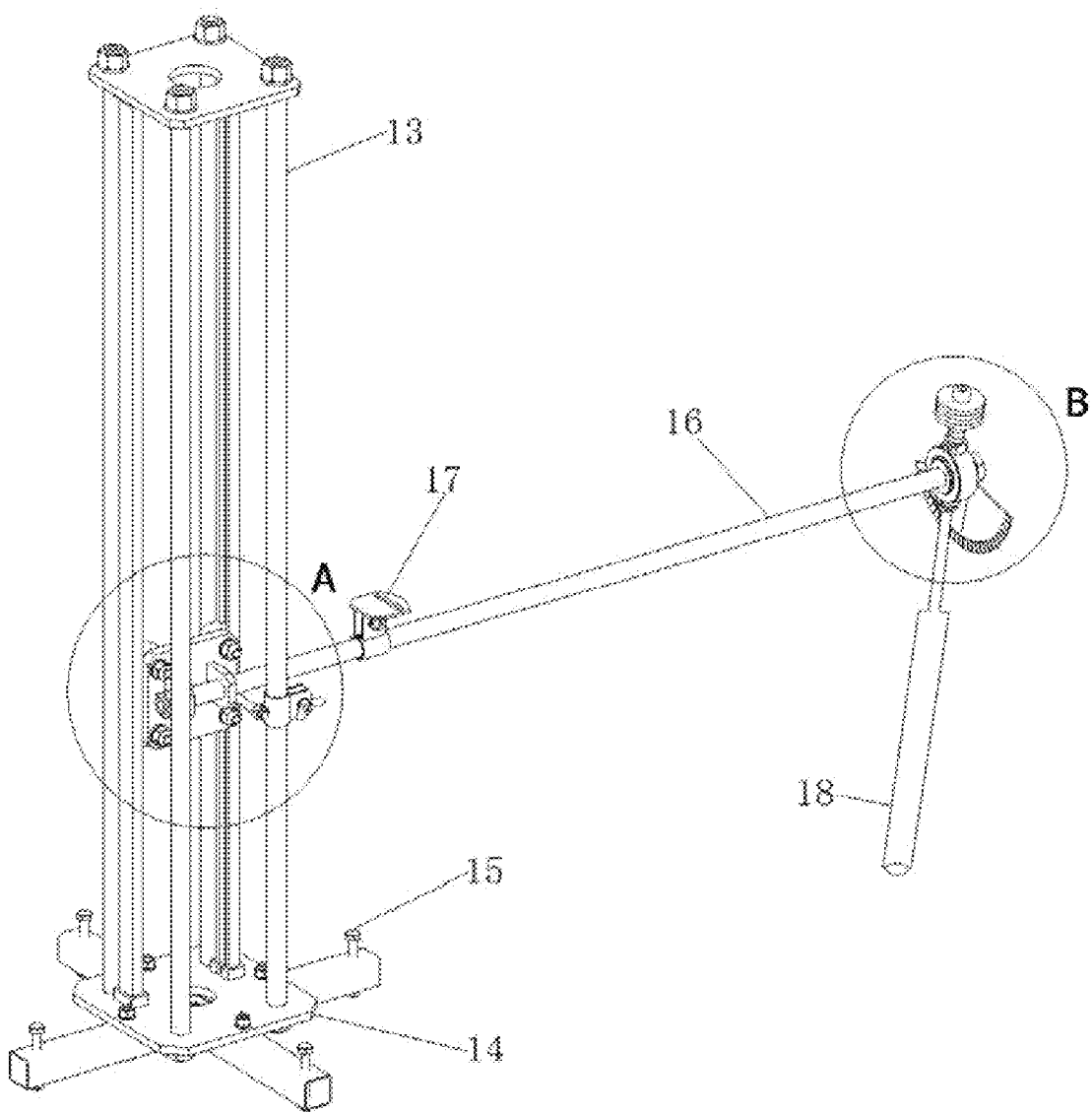
FIG. 5 is a schematic view of the structure of the device for measuring the flow rate of steel melt according to the invention.

The real flow rate measuring device consists of two parts: a flow rate detecting rod 18 plus a deflection means for the flow rate detecting rod (part B in FIG. 5), and a support structure for the flow rate detecting rod, as shown in FIG. 5.

The flow rate detecting rod 18 may rotate freely in the flowing direction of the steel melt with the aid of the deflection means B for the flow rate detecting rod, and the deflection angle of the flow rate detecting rod 18 may be converted to the flow rate of the high-temperature steel melt near the surface. Meanwhile, the flow rate detecting rod 18 may be moved up and down freely with the aid of an up-down movement means A which facilitates insertion of the flow rate detecting rod 18 in the steel melt and lift of the flow rate detecting rod 18 out of the steel melt. The flow rate detecting rod 18 may be moved back and forth with the aid of a length adjustor 17 of a horizontal support rod for the flow rate detecting rod.

The support structure for the flow rate detecting rod mainly comprises supports 13 of the flow rate measuring device, a support base 14 and leveling screws 15. Four supports 13 of the flow rate measuring device are fixed vertically to the upper surface of the support base 14, and four underlying feet extend from the lower surface thereof in four directions respectively, wherein a leveling screw 15 is arranged vertically on each underlying foot, and is adjustable in the vertical direction. With the aid of the leveling screws 15, the horizontal support rod 16 may be kept at a horizontal position during measurement of the flow rate so as to improve the accuracy of the flow rate measurement.

The specific structures of the deflection means B for the flow rate detecting rod and the up-down movement means A will be detailed with reference to FIGS. 6 and 7 as follows.

Figure 6:
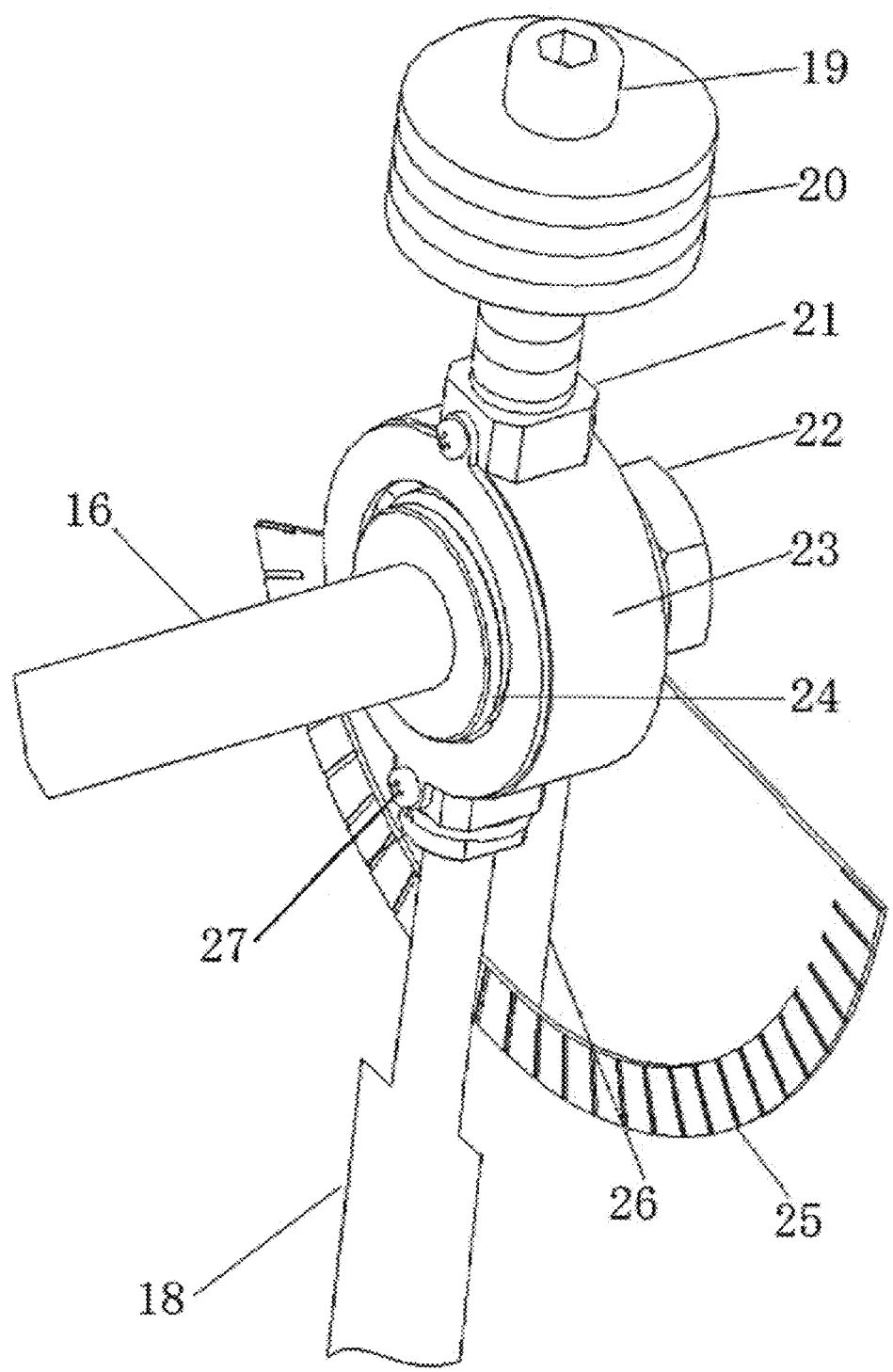
FIG. 6 is a partially enlarged view of part B in FIG. 5.

The flow rate detecting rod 18 and the deflection means for the flow rate detecting rod (part B in FIG. 5) consists of the following parts as shown in FIG. 6. The deflection device B for the flow rate detecting rod comprises a flow rate detecting rod counterweight, a deflection bearing sleeve 23, a deflection bearing 24, a deflection angle indicating board 25, a deflection angle pointer 26 and a fastening screw 27 for the flow rate detecting rod, wherein the flow rate detecting rod counterweight comprises an upper fastening screw 19, a balancing disc 20 and a lower fastening screw 21.

Both the deflection bearing sleeve 23 and the deflection bearing 24 are circular parts, and the deflection bearing 24 is slidably set against the inner wall of the deflection bearing sleeve 23. The outer surface of the deflection bearing sleeve 23 comprises a counterweight rod extending outward. The counterweight rod and the fastening screw 27 for the flow rate detecting rod are fixed to the outer surface of the deflection bearing sleeve 24, and they are spaced by 180 degrees. The flow rate detecting rod counterweight is fixed to the counterweight rod. The deflection angle indicating board 25 has a shape of sector, wherein the vertex of the sector is fixed on an end face of the deflection bearing 24, and the surface of the arc of the sector comprises scales. The deflection angle pointer 26 is fixed to the vertex of the sector at one end, and the other end points to the scales on the arc of the sector. The deflection angle pointer 26 is parallel to the flow rate detecting rod, and rotates as the flow rate detecting rod rotates. The flow rate detecting rod 18 is fixed to the outer surface of the deflection bearing sleeve 23 using the fastening screw 27 for the flow rate detecting rod.

As shown in FIG. 6, the balancing disc 20 is a circular counterweight disc set around the counterweight rod. The upper fastening screw 19 and the lower fastening screw 21 are fixed to the counterweight rod from the upper and lower sides respectively, limiting the position of the balancing disc 20. The horizontal support rod 16 is arranged horizontally, one end of which is connected to the up-down movement means A for the flow rate detecting rod, and the other end of which is inserted into the circular ring of the deflection bearing 24. The support rod fastening screw 22 is arranged at the top of the horizontal support rod 16, tightly close to the end face of the deflection bearing 24.

By adopting a balancing disc 20 of appropriate weight, the barycenter G of the flow rate detecting rod 18 may be adjusted to a position close to the center of the deflection bearing 24 for the flow rate detecting rod, such that the flow rate detecting rod 18 and the balancing disc 20 are substantially in a state of gravity balance. As such, the rotational sensitivity of the flow rate detecting rod 18 may be maximized. Particularly under conditions of a low flow rate of the steel melt, the flow rate of the steel melt near the surface thereof can be measured more accurately.

The deflection angle of the flow rate detecting rod 18 may be obtained easily with the aid of the deflection angle indicating board 25 and the deflection angle pointer 26. The use of the deflection bearing 24 for the flow rate detecting rod may increase the deflection sensitivity of the flow rate detecting rod 18 under the impact of the flowing steel melt. In addition, the fastening screw 27 for the flow rate detecting rod facilitates replacement of the flow rate detecting rod after each measurement of the flow rate. All of the above parts are made of stainless steel or other non-magnetic metal materials, so as to avoid interference of electromagnetic field on the measurement results of the flow rate.

Figure 7:
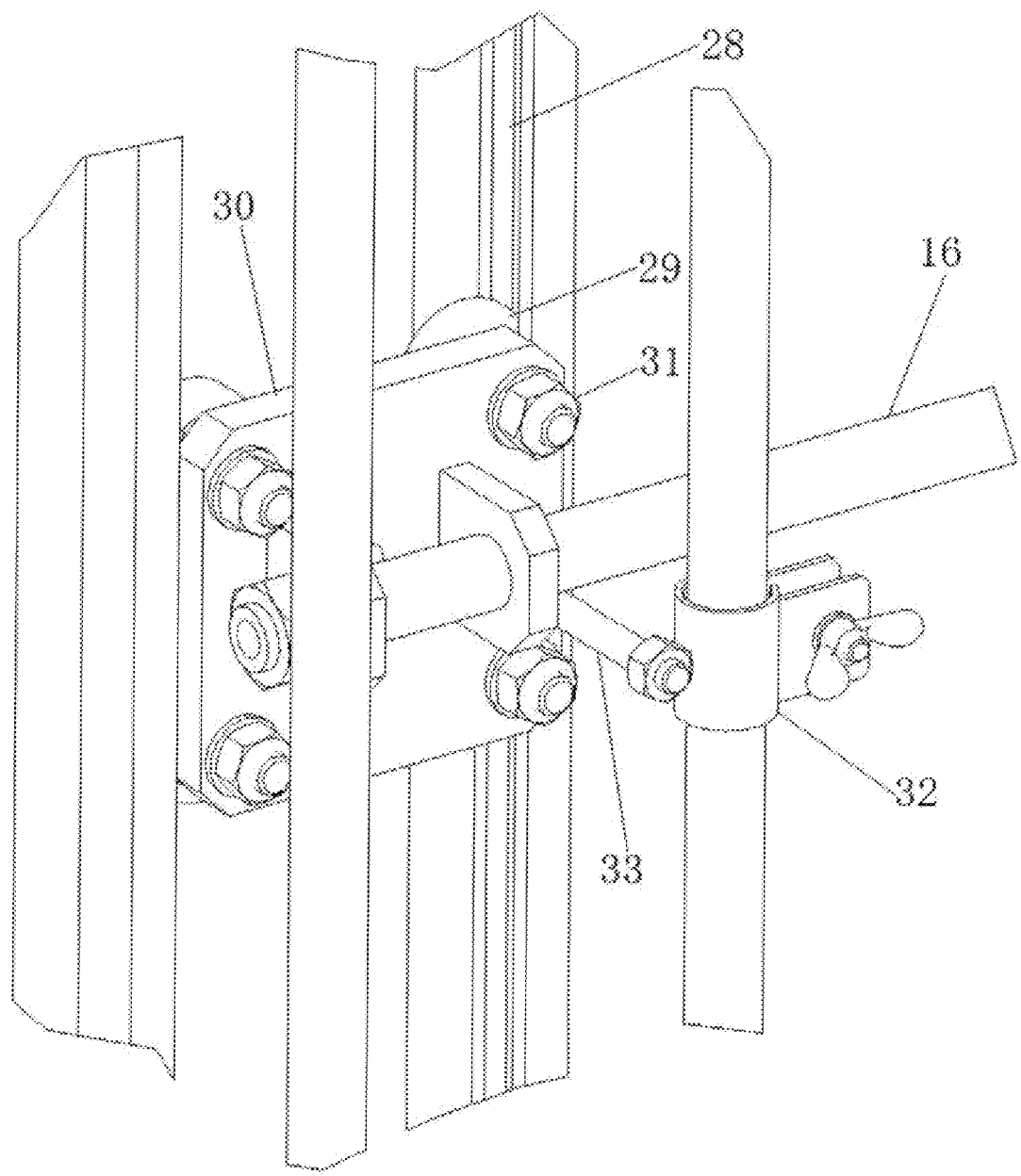
FIG. 7 is a partially enlarged view of part A in FIG. 5.

As shown in FIG. 7, the up-down movement means for the flow rate detecting rod (part A in FIG. 5) consists of the following parts: an up-down moving rail 28, pulleys 29 for up-down movement, an up-down moving support plate 30, fastening screws 31 for the up-down moving support plate, an up-down moving position fixing means 32, and a connecting rod 33 for position fixing in up-down movement.

The up-down moving rail 28 is arranged on the support 13 of the flow rate measuring device. Four pulleys 29 for up-down movement are arranged in the up-down moving support plate 30, and fixed to the lower surface of the support plate 30 using the fastening screws 31 for the up-down moving support plate which penetrate through the upper and lower surfaces of the up-down moving support plate 30. The pulleys 29 for up-down movement are inset in the up-down moving rail 28. The up-down moving position fixing means 32 is arranged on the support 13 of the flow rate measuring device, and the up-down moving support plate 30 and the up-down moving position fixing means 32 are connected by the connecting rod 33 for position fixing in up-down movement. Up-and-down free movement and immobilization of the flow rate detecting rod may be realized through the pulleys 29 for up-down movement, the up-down moving rail 28 and the up-down moving position fixing means 32.

Figure 8:
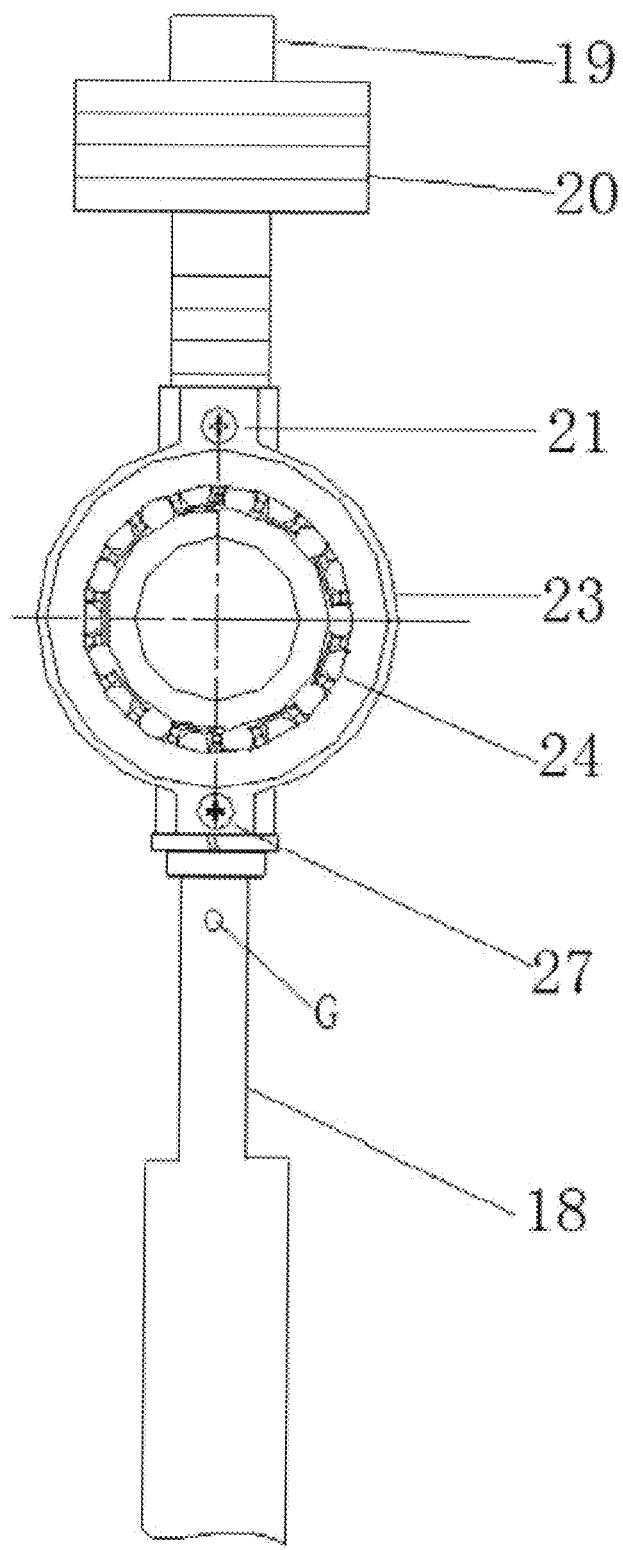
FIG. 8 is a schematic view showing an embodiment of the deflection bearing and barycenter of a flow rate detecting rod.

FIG. 8 shows a schematic view of an embodiment of a flow rate detecting rod, a balancing disc and a deflection bearing. The flow rate detecting rod comprises an $Al_2O_3$ refractory material tube fittedly connected with a stainless steel rod and has a diameter of 20 mm and a length of 425 mm. The total length of the flow rate detecting rod and the balancing disc is 537 mm. The distance between the barycenter G and the center of the deflection bearing is only 45.0 mm. A very short distance between the barycenter and the center of the deflection bearing is favorable for increasing the deflection sensitivity of the flow rate detecting rod. Particularly under conditions of a low flow rate of the steel melt, the measurement sensitivity of the flow rate near the surface of the steel melt may be increased.

Figure 10:
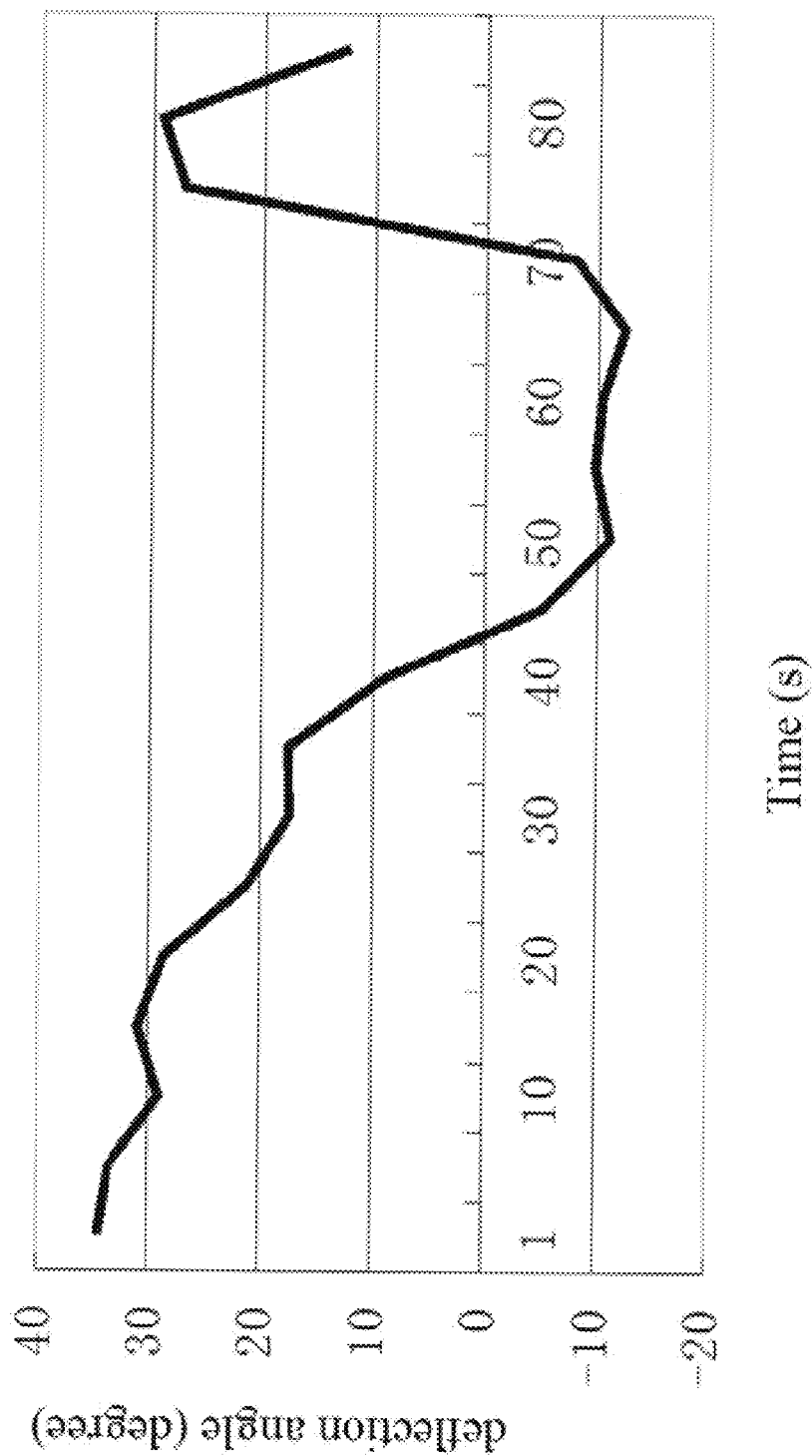
FIG. 10 is a graph showing the deflection angle of a flow rate detecting rod as a function of time.

FIG. 10 shows the deflection angle of a flow rate detecting rod as a function of time, wherein measurement lasts for 88 s, the deflection of the flow rate detecting rod toward the submerged nozzle is set to be positive deflection, and the flow rate toward the submerged nozzle is set to be positive. These settings apply hereafter.

Figure 11:
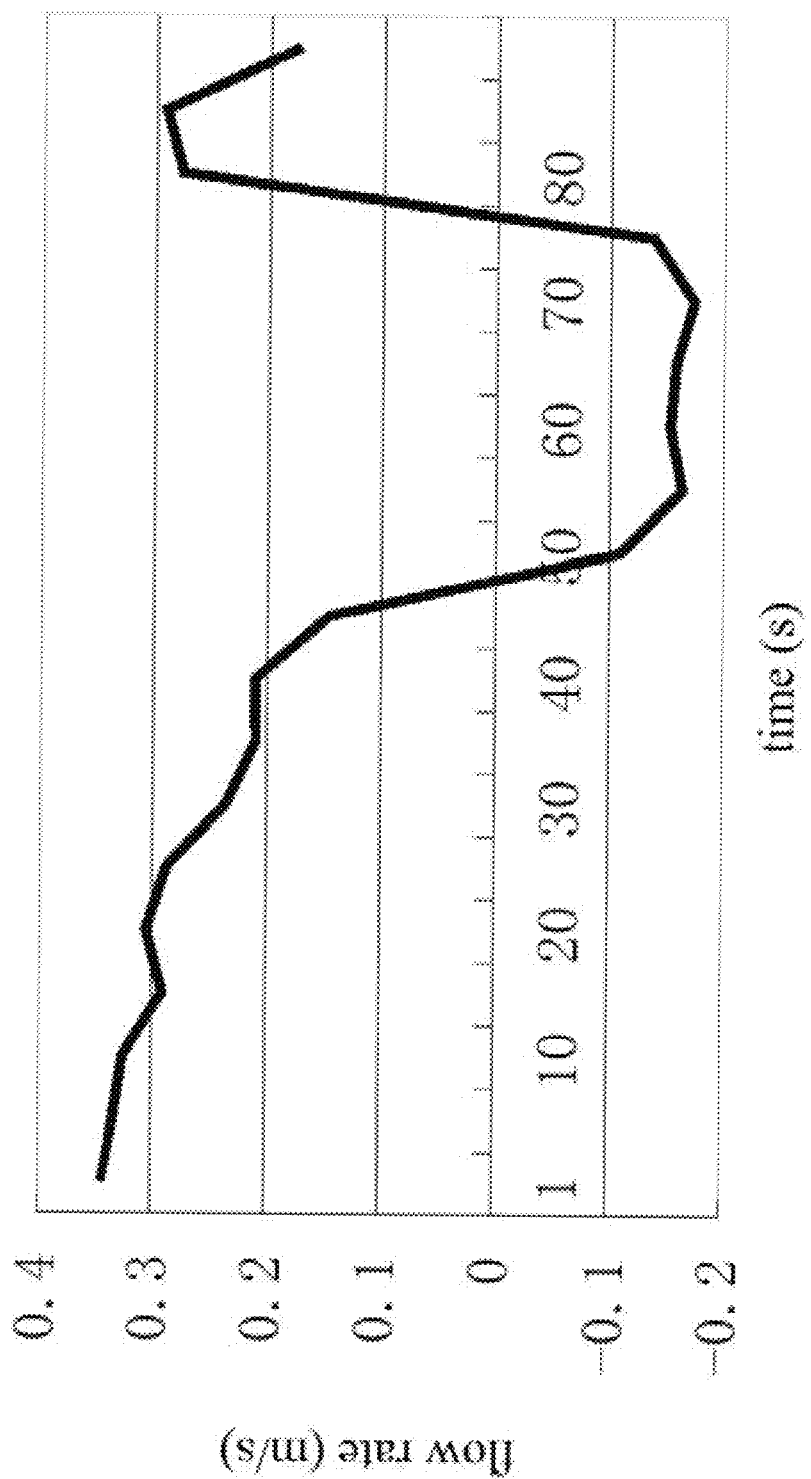
FIG. 11 is a graph showing the flow rate of steel melt at the surface in a crystallizer as a function of time.

The deflection angle is positive before 45 s, becomes negative between 45 s and 74 s, and turns positive after 74 s. The corresponding flow rate of the steel melt at the surface in a crystallizer is shown in FIG. 11, wherein the steel melt flows toward the submerged nozzle before 45 s, toward the short-side wall of the crystallizer between 45 s and 74 s, and toward the submerged nozzle again after 74 s. It is discovered from the continuous measurement of the flow field in the crystallizer that the flow rate of the steel melt near the surface in the crystallizer is not stable, but changes in magnitude and direction as time elapses. This demonstrates that the flow field in a crystallizer is not a steady flow field. Hence, an important task related to the control over the flow field in a crystallizer is how to regulate the flow field in a crystallizer to be a desirable flow field.

Figure 12:
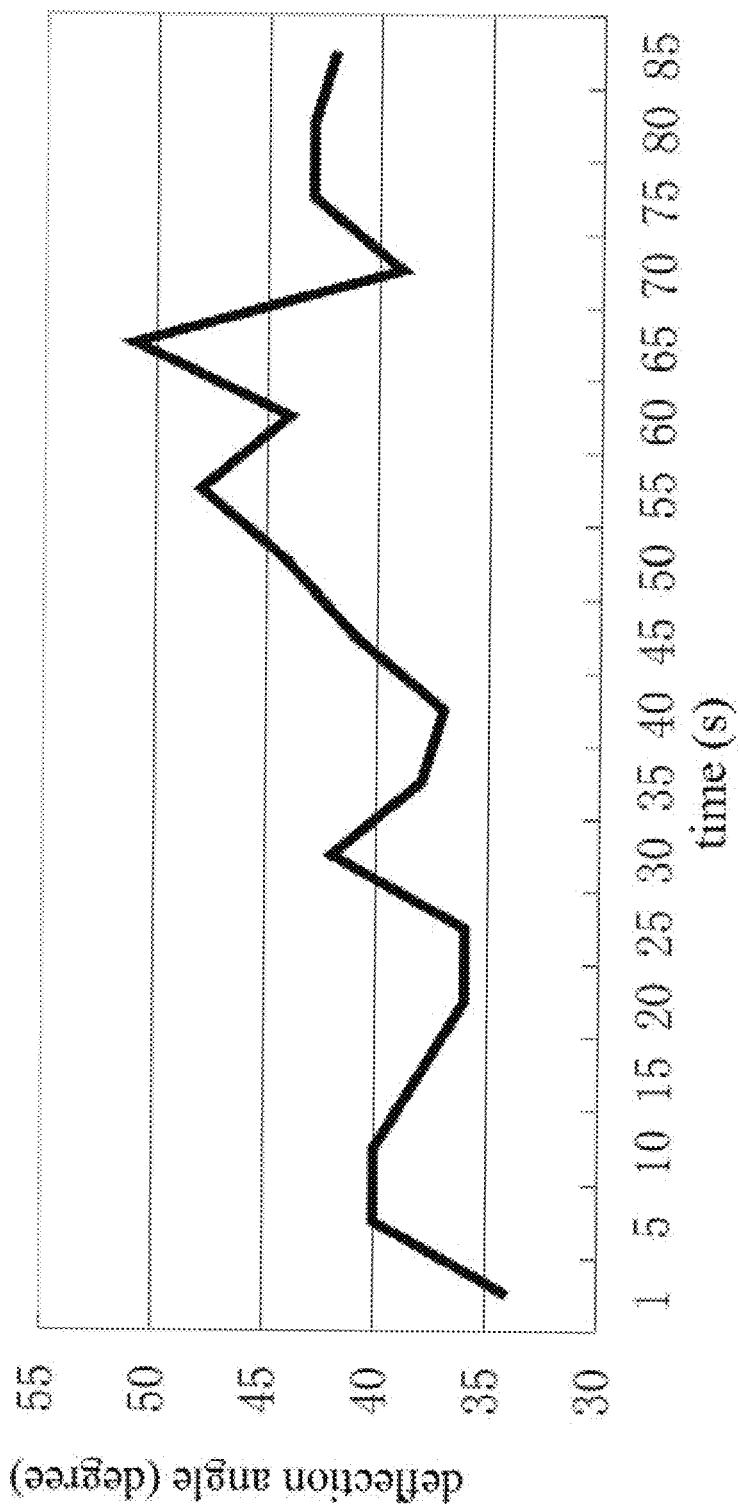
FIG. 12 is a graph showing the deflection angle of a flow rate detecting rod as a function of time.
Figure 13:
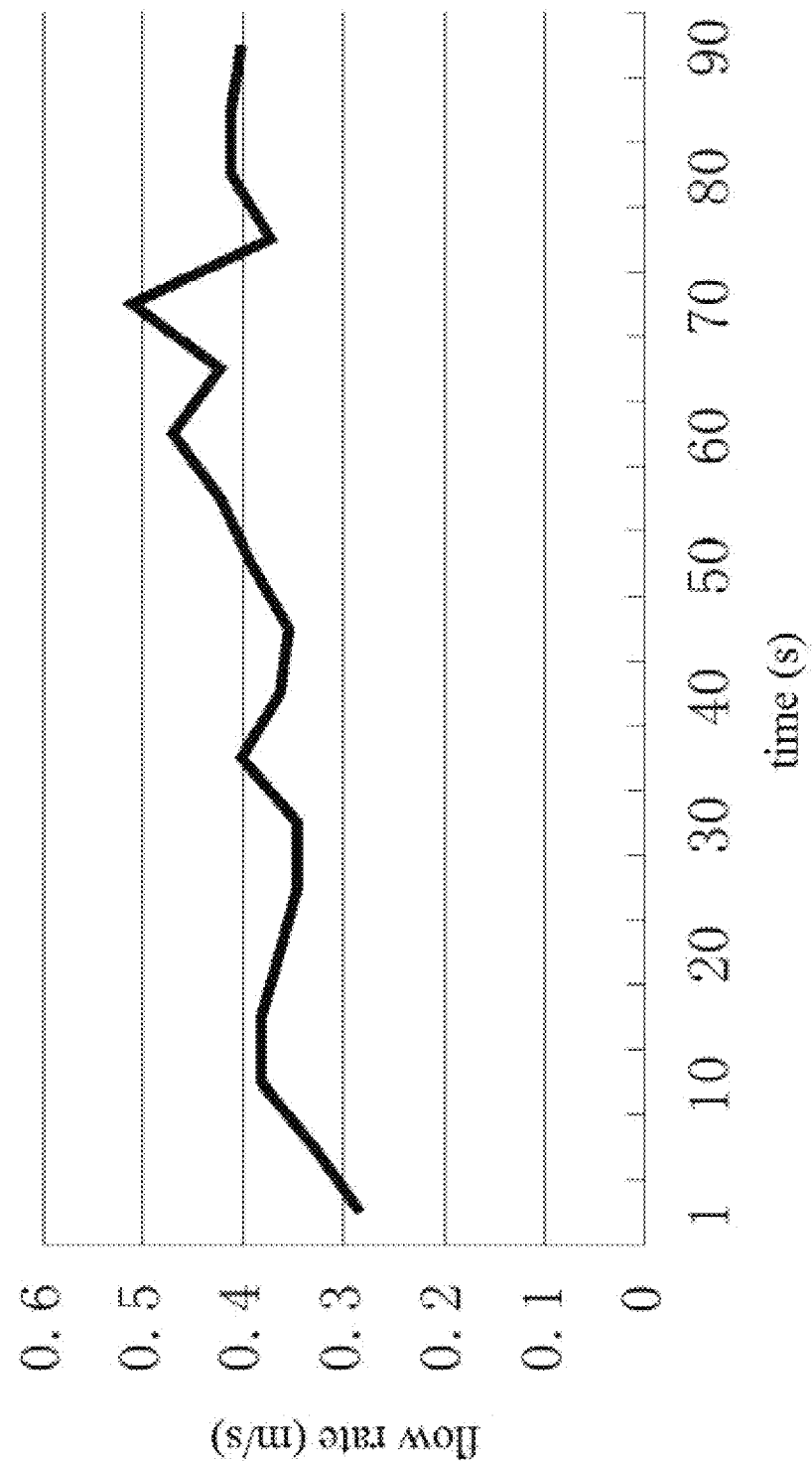
FIG. 13 is a graph showing the flow rate of steel melt at the surface in a crystallizer as a function of time.

FIG. 12 shows another set of measurement results of the deflection angle of a flow rate detecting rod as a function of time, wherein measurement lasts for 88 s. The corresponding flow rate of the steel melt at the surface in a crystallizer is shown in FIG. 13. As shown by this set of measurement results, though the flow direction of the steel melt near the surface in the crystallizer does not change, its magnitude changes as a function of time, indicating again that the flow field in a crystallizer is not a steady flow field. The flow rate near the surface in the crystallizer is 0.3-0.5 m/s, and the flow direction points toward the submerged nozzle.

Figure 14:
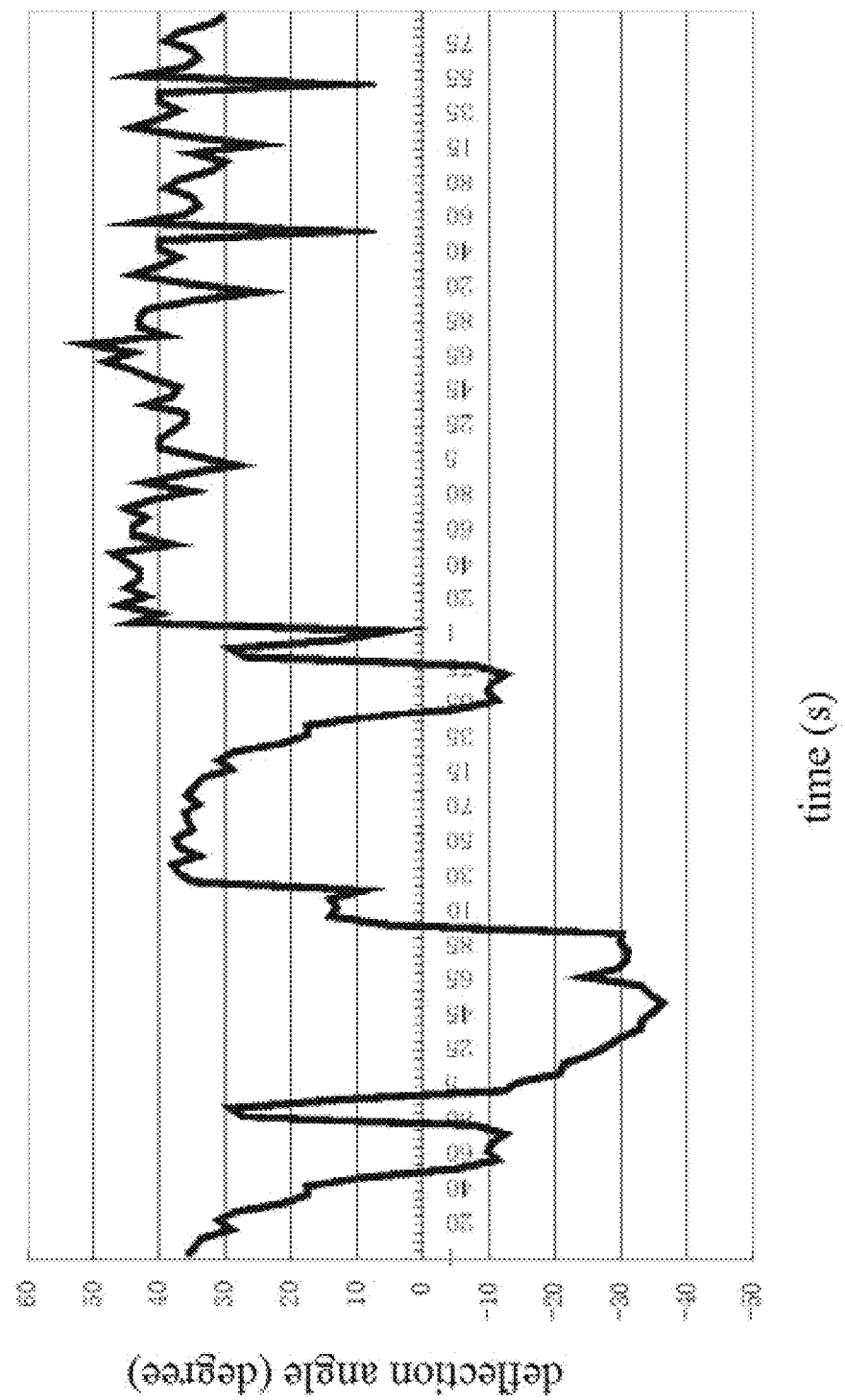
FIG. 14 is a comprehensive graph showing eight sets of measurement results of the deflection angle of a flow rate detecting rod as a function of time.
Figure 15:
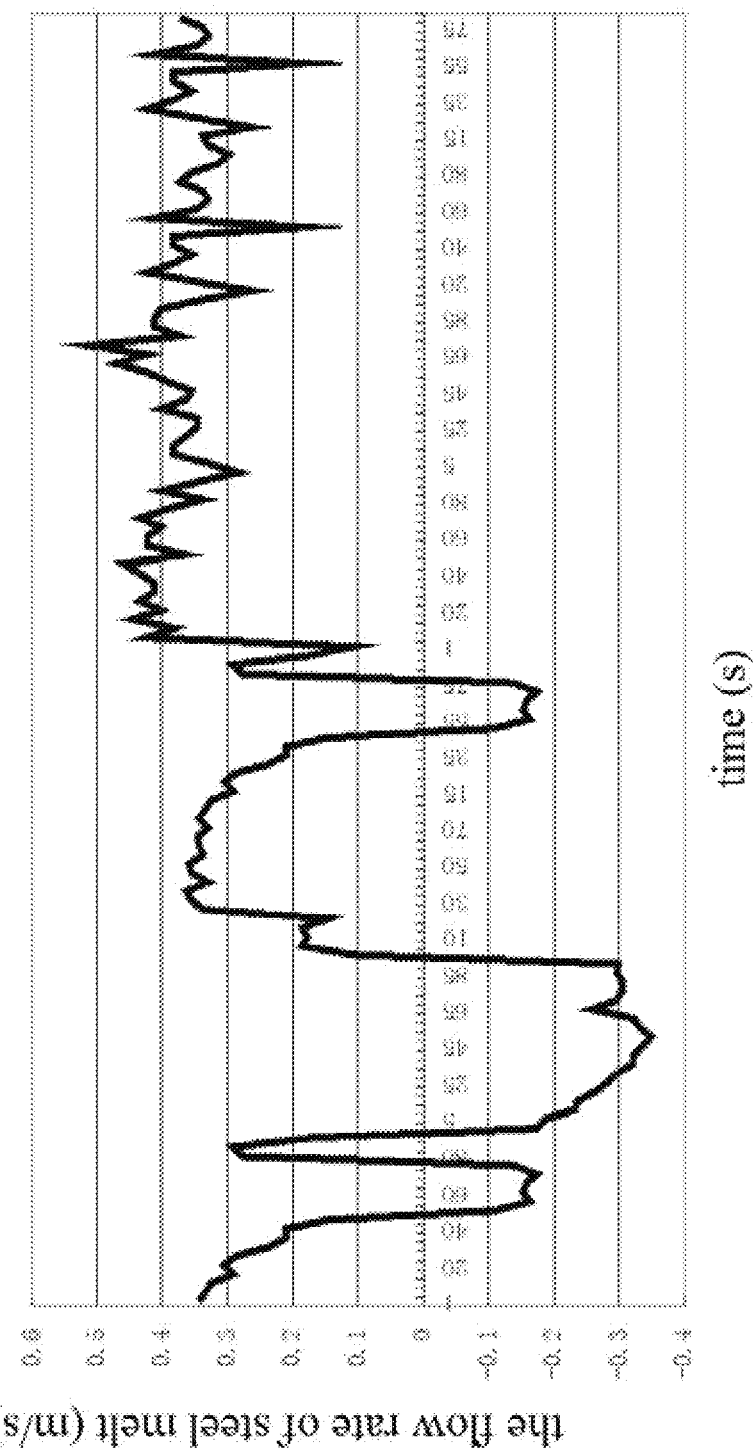
FIG. 15 is a comprehensive graph showing eight sets of measurement results of the flow rate of steel melt at the surface in a crystallizer as a function of time.

FIG. 14 shows the comprehensive results of eight sets of measurement data of the deflection angle of a flow rate detecting rod as a function of time, wherein the measuring time for each set of data is 70-88 s. The corresponding flow rate of the steel melt at the surface in a crystallizer is shown in FIG. 15. As shown by these eight sets of data, the time during which the molten steel flows toward the immersed nozzle accounts for 81.3%, and the time during which the molten steel flows toward the short-side wall of the crystallizer accounts for 18.7%. This demonstrates that when the flow rate at a position in a crystallizer is to be observed, it can only be described fully using a curve of the flow rate as a function of time in addition to the use of the magnitude and direction of the flow rate.

It is to be appreciated by those skilled in the art that the above description only discloses one or more embodiments of a number of examples, and is not intended to limit the invention. Any technical solution obtainable by equivalent modification, variation and substitution of the above embodiments falls within the protection scope defined by the claims of the invention as long as it does not depart from the spirit and scope of the invention.

What is claimed is:

1. A device for continuously measuring the flow rate of steel melt near the surface thereof, the device comprising:
    a flow rate detecting rod comprising a refractory material tube at one end and a stainless steel rod at an opposing end, wherein the stainless steel rod is fittedly connected with the refractory material tube;
    wherein the flow rate detecting rod comprises a refractory material of a single compound selected from the group consisting of $Al_2O_3$, $MgO$, $SiO_2$, $CaO$, $ZrO_2$, $SiC$ or of a composite of two or more of a compound selected from the group consisting of $Al_2O_3$, $MgO$, $SiO_2$, $CaO$, $ZrO_2$, $SiC$;
    wherein the flow rate detecting rod has a length of 10-100 cm and a diameter of 5-50 mm; and
    a deflection device for the flow rate detecting rod, comprising a fastening screw for the flow rate detecting rod, wherein the flow rate detecting rod is fixed to the deflection device by the fastening screw for the flow rate detecting rod;
    the deflection device comprising a flow rate detecting rod counterweight, a deflection bearing sleeve, a deflection bearing, a deflection angle indicating board, a deflection angle pointer and the fastening screw for the flow rate detecting rod;
    wherein both the deflection bearing sleeve and the deflection bearing are circular, and the deflection bearing is slidably set against an inner wall of the deflection bearing sleeve;
    wherein the outer surface of the deflection bearing sleeve comprises a counterweight rod extending outward, wherein the counterweight rod and the fastening screw for the flow rate detecting rod are fixed to the outer surface of the deflection bearing sleeve respectively and spaced by 180 degrees, and the flow rate detecting rod counterweight is fixed to the counterweight rod;
    the deflection angle indicating board has a shape of sector, wherein the vertex of the sector is fixed to an end face of the deflection bearing, and the surface of the arc of the sector comprises scales;
    the deflection angle pointer is fixed to the vertex of the sector at one end, and the other end points to the scales on the arc of the sector, wherein the deflection angle pointer is parallel to the flow rate detecting rod, and rotates as the flow rate detecting rod rotates; and
    the flow rate detecting rod is fixed to the outer surface of the deflection bearing sleeve using the fastening screw for the flow rate detecting rod.

2. The device of claim 1, wherein the flow rate detecting rod counterweight comprises an upper fastening screw, a balancing disc and a lower fastening screw; and the balancing disc is a circular counterweight disc set around the counterweight rod, wherein the upper and lower fastening screws are fixed to the counterweight rod from the upper and lower sides respectively, limiting the position of the balancing disc.

3. The device of claim 1, further comprising supports of the flow rate measuring device, a support base and leveling screws, wherein four supports of the flow rate measuring device are fixed vertically to the upper surface of the support base, and four underlying feet extend from the lower surface of the support base in four directions respectively, wherein a leveling screw is arranged vertically on each underlying foot, and the leveling screw is adjustable in the vertical direction.

4. The device of claim 3, further comprising an up-down movement element for the flow rate detecting rod, wherein the up-down movement element comprises a moving rail, moving pulleys, a moving support plate, fastening screws for the moving support plate, a position fixing element and a connecting rod for fixing position;
    wherein the moving rail is arranged on the support of the flow rate measuring device; four moving pulleys are arranged on the moving support plate, and fixed to the lower surface of the support plate using the fastening screws for the moving support plate which penetrate through the upper and lower surfaces of the support plate; and the moving pulleys are inset in the moving rail; and
    wherein the position fixing element is set on the support of the flow rate measuring device, and the moving support plate and the position fixing element are connected by the connecting rod for fixing position.

5. The device of claim 4, further comprising
    a horizontal support rod and a support rod fastening screw,
    wherein the horizontal support rod is arranged horizontally, one end of which is connected to the up-down movement element for the flow rate detecting rod, and the other end of which is inserted into the circular ring of the deflection bearing, wherein the support rod fastening screw is arranged at the top of the horizontal support rod, tightly close to an end face of the deflection bearing.

6. A method for continuously measuring the flow rate of steel melt near the surface thereof by using the device of claim 1, the method comprising the following steps:
    a) determining a barycenter of the flow rate detecting rod, a rotational pivot of the flow rate detecting rod and an acting point of an impact force on the flow rate detecting rod;
    b) calculating the distance between the rotational pivot and the barycenter, and the distance between the rotational pivot and the acting point of the impact force;
    c) measuring gravity value of the flow rate detecting rod;
    d) baking the flow rate detecting rod at a high temperature in the range of 1000-1500° C. for about 10 min;
    e) inserting the baked flow rate detecting rod into the steel melt to obtain a rotational angle and an insertion depth;
    f) collecting continuous and average values of the rotational angle in a period of time;
    g) calculating the impact force of the steel melt;

h) measuring continuous and average values of the projection area of the flow rate detecting rod in a direction perpendicular to the flowing direction of the steel melt, density of the steel melt and drag force coefficient;

i) calculating the peak value, the average value and the continuous values of the flow rate of the steel melt based on the continuous and average values of the rotational angle, the projection area, the density of the steel melt and the drag force coefficient; and j) estimating the flow rate of the steel melt based on the peak value, the average value and the continuous values of the flow rate of the steel melt.

7. The method of claim 6, wherein the flow rate detecting rod is inserted into the flowing steel melt and is subjected to the action of gravity and the impact force of the flowing steel melt; when the flow rate detecting rod deflects to a certain angle and reaches a balance state, the moment generated by the gravity and the moment generated by the impact force of the flowing steel melt arrives at equilibrium.

8. The method of claim 6, wherein step a) further comprises setting a flow rate detecting rod counterweight to adjust the barycenter of the flow rate detecting rod to a position close to the rotational pivot of the flow rate detecting rod, such that the flow rate detecting rod and the counterweight are substantially in a state of gravity balance.

* * * * *